L. E. SUFFERT.
Cooking Stove.
No. 40,863.  Patented Dec. 8, 1863.
Fig: 1.
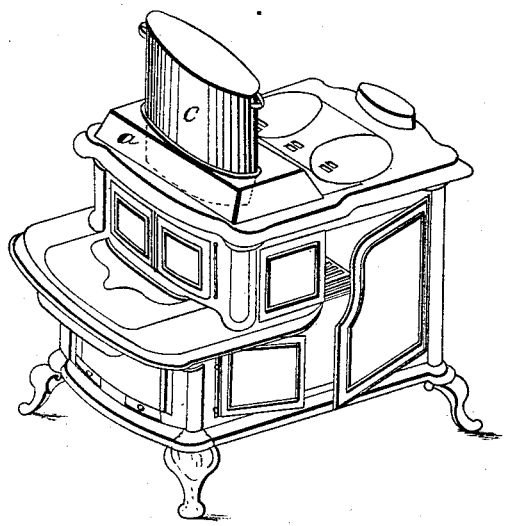
Fig: 2.
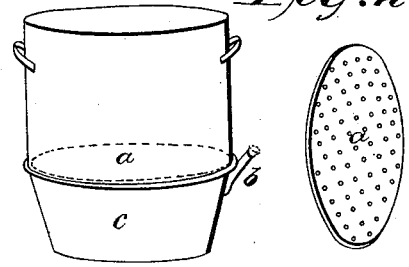
Fig: 5.
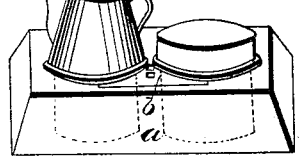
Fig: 3.
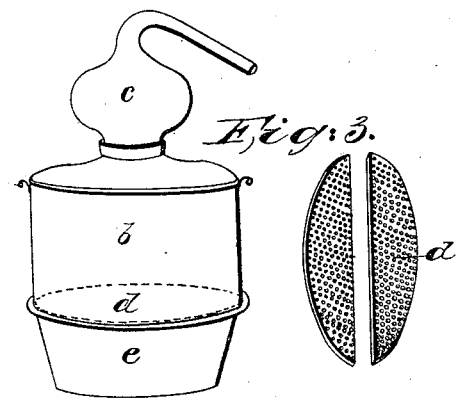
Fig: 4.
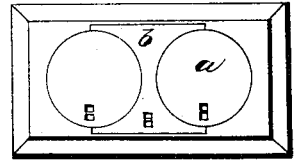
Fig: 6.
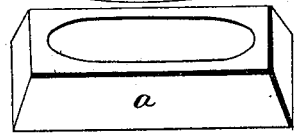
Witnesses:
John F. Haas
A. C. Hartman
Inventor:
Louis E. Suffert

UNITED STATES PATENT OFFICE.

LOUIS E. SÜFFERT, OF ST. LOUIS, MISSOURI.

IMPROVEMENT IN COOKING-STOVES.

Specification forming part of Letters Patent No. 40,863, dated December 8, 1863.

*To all whom it may concern:*

Be it known that I, LOUIS E. SÜFFERT, of St. Louis, in the county of St. Louis and State of Missouri, have invented a new and Improved Mode of Constructing a Washing, Cooking, and Distilling Apparatus; and I do hereby declare that the following is a full and exact description thereof, reference being had to the accompanying drawings, and to the letters of reference marked thereon.

The nature of my invention consists in the combination of a top box, Figs. $1^a$, $4^a$, $5^a$, and 6, to be attached to a common cooking stove, furnace, or range, with washing, cooking, and distilling vessels provided with tapered prolongations, Figs. $1^d$, $2^c$, and $3^c$, fitting into above-mentioned top box.

To enable others skilled in the art to make and use my invention, I will proceed to describe its construction and operation.

I first construct a sheet or cast iron box or frame wide enough at the bottom to cover the whole top of the fire part of the stove, furnace, Figs. $1^a$, $4^a$, $5^a$, 6. The box or frame is open at the top and bottom, the sides tapered. The bottom is open wide enough to match the heating apparatus that shall be used, and the width of the surface is to correspond with the vessels that shall be used. This box may be made from four to sixteen inches high, according to the size of the heating apparatus used, and corresponding with the size of the lower part of my vessels.

I furthermore construct my washing, cooking, and distilling vessels by providing the common vessels now in use with tapered additions deep enough to reach nearly down to the fire when inserted in the above-mentioned top box, Figs. $1^a$, $2^c$, $3^c$. At the place where this tapered addition commences, and where in commonly-used vessels there is the bottom, I insert a removable perforated bottom, to be taken out when the vessels have to be cleaned. Smaller cooking, &c., utensils may be used by affixing a center piece, Figs. $4^b$, $5^b$, to the top hole of my box.

I fill the lower part of my washing, &c., vessels with water so far that when boiling only the steam produced will reach the contents of its upper part above the false bottom. A water-supply pipe may be attached for the purpose of filling up water when the supply in the vessel is nearly exhausted, Fig. $2^b$.

It is obvious that by the combination of my top box and vessels a large heating-surface is produced, and therefore I produce with the same fuel now used by far a greater effect.

I claim as my invention—

The removable heating jacket or chamber to be placed on top of the stove, furnace, or any other fire-place, Fig. $6^a$, substantially as described above.

LOUIS E. SÜFFERT.

Witnesses:
EDWARD ERDMANN,
JOHN F. HAAS.